United States Patent
Sung et al.

(10) Patent No.: US 9,732,171 B2
(45) Date of Patent: Aug. 15, 2017

(54) OLEFIN-BASED POLYMER WITH EXCELLENT PROCESSABILITY

(71) Applicant: LG CHEM, LTD., Seoul (KR)

(72) Inventors: Yu Taek Sung, Daejeon (KR); Heon Yong Kwon, Daejeon (KR); Ki Soo Lee, Daejeon (KR); Dae Sik Hong, Daejeon (KR); Dong Hoon Jeong, Daejeon (KR); Eun Young Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/032,014

(22) PCT Filed: Sep. 11, 2014

(86) PCT No.: PCT/KR2014/008481
§ 371 (c)(1),
(2) Date: Apr. 25, 2016

(87) PCT Pub. No.: WO2015/072658
PCT Pub. Date: May 21, 2015

(65) Prior Publication Data
US 2016/0369020 A1    Dec. 22, 2016

(30) Foreign Application Priority Data

Nov. 18, 2013  (KR) .................. 10-2013-0139997
Aug. 29, 2014  (KR) .................. 10-2014-0114385

(51) Int. Cl.
*C08F 210/16*    (2006.01)
*C08F 4/6592*    (2006.01)
(Continued)

(52) U.S. Cl.
CPC .......... *C08F 210/16* (2013.01); *C08F 4/6592* (2013.01); *C08F 10/00* (2013.01); *C08J 5/18* (2013.01); *C08J 2323/08* (2013.01)

(58) Field of Classification Search
CPC ..................................................... C08F 210/16
See application file for complete search history.

(56) References Cited

U.S. PATENT DOCUMENTS 4,935,474 A    6/1990   Ewen et al.
5,914,289 A    6/1999   Razavi
(Continued)

FOREIGN PATENT DOCUMENTS

EP    2428525 A2    3/2012
EP    2460809 A2    6/2012
(Continued)

OTHER PUBLICATIONS

Pan, et al., "Investigation of the effect of branched structure on the performances of the copolymers synthesized from ethylene and alpha-olefinwith rac-Et(Ind)2ZrCl2/MMAO catalyst system," Polymer, ELSEVIER, vol. 47, No. 4, pp. 1465-72 (2006).

*Primary Examiner* — Rip A Lee
(74) *Attorney, Agent, or Firm* — Dentons US LLP

(57) ABSTRACT

Provided is an olefin-based polymer with excellent processability. The olefin-based polymer according to the present invention has a high molecular weight and a broad molecular weight distribution to show excellent processability and improved transparency, thereby being used in desired applications.

10 Claims, 1 Drawing Sheet

(51) Int. Cl.
*C08F 10/00* (2006.01)
*C08J 5/18* (2006.01)

(56) References Cited

U.S. PATENT DOCUMENTS

| | | | |
|---|---|---|---|
| 6,448,341 | B1 | 9/2002 | Kolthammer |
| 6,828,394 | B2 | 12/2004 | Vaughan et al. |
| 6,841,631 | B2 | 1/2005 | Loveday et al. |
| 6,894,128 | B2 | 5/2005 | Loveday et al. |
| 7,148,298 | B2 | 12/2006 | Jensen |
| 7,220,801 | B2 | 5/2007 | Dunaway |
| 7,851,578 | B2 | 12/2010 | Blackmon et al. |
| 8,101,685 | B2 * | 1/2012 | Jiang ............ C08L 23/06 525/191 |
| 8,383,754 | B2 | 2/2013 | Yang |
| 8,426,538 | B2 | 4/2013 | Jensen |
| 9,079,991 | B2 * | 7/2015 | Ker ............ C08F 210/16 |
| 2003/0022998 | A1 | 1/2003 | Karande et al. |
| 2003/0232716 | A1 * | 12/2003 | McDaniel ............ C08F 10/00 502/115 |
| 2008/0004411 | A1 * | 1/2008 | Sukhadia ............ C08J 5/18 526/348.1 |
| 2010/0068488 | A1 | 3/2010 | Chai |
| 2012/0010375 | A1 | 1/2012 | Yang et al. |
| 2012/0259077 | A1 | 10/2012 | Ha et al. |
| 2012/0329641 | A1 | 12/2012 | Yang et al. |
| 2013/0029125 | A1 * | 1/2013 | Tse ............ C08L 23/04 428/220 |
| 2013/0144019 | A1 * | 6/2013 | Demirors ............ C08F 10/00 526/165 |

FOREIGN PATENT DOCUMENTS

| | | | |
|---|---|---|---|
| JP | 2005-53997 A * | 3/2005 | ............ C08L 23/04 |
| JP | 2010-513627 A | 4/2010 | |
| JP | 2013-538915 A | 10/2013 | |
| JP | 5409381 B2 | 2/2014 | |
| KR | 10-2001-0022910 A | 3/2001 | |
| KR | 10-2004-0076965 A | 9/2004 | |
| KR | 10-2007-0002473 A | 1/2007 | |
| KR | 10-2009-0094003 A | 9/2009 | |
| KR | 10-2010-0102854 A | 9/2010 | |
| KR | 10-2012-0087706 A | 8/2012 | |
| KR | 10-2013-0019793 A | 2/2013 | |
| KR | 10-2013-0113322 A | 10/2013 | |
| KR | 10-2015-0062924 A | 6/2015 | |
| WO | 2011-014022 A2 | 2/2011 | |
| WO | 2011-056020 A2 | 5/2011 | |

\* cited by examiner

【FIG. 1】
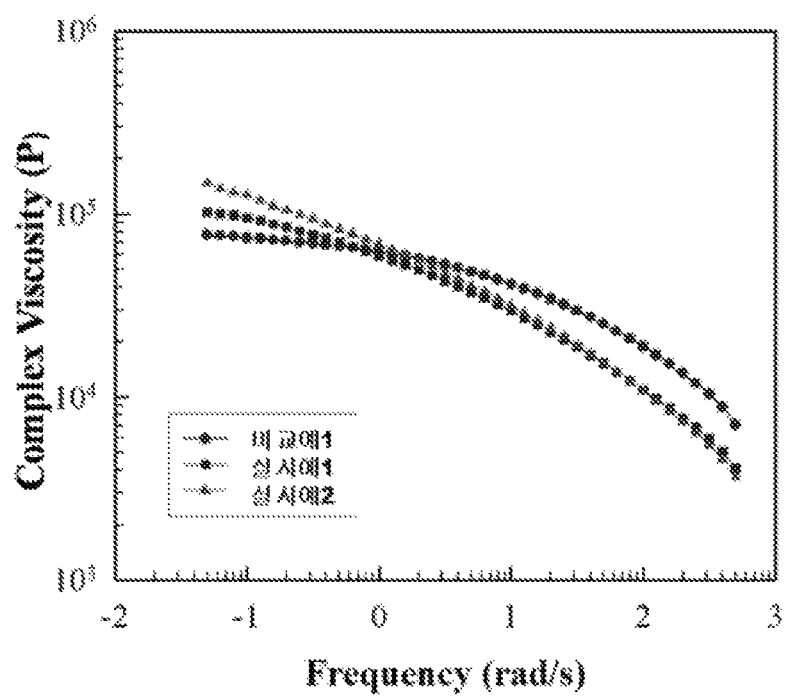
【FIG. 2】
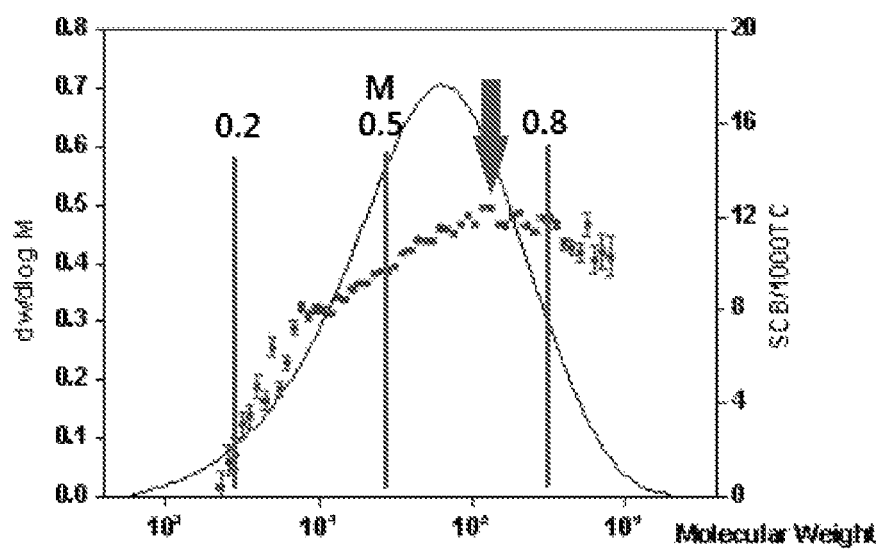

ically supported metallocene catalyst with an
OLEFIN-BASED POLYMER WITH EXCELLENT PROCESSABILITY This application is a National Stage Application of International Application No. PCT/KR2014/008481 filed on Sep. 11, 2014, which claims the benefit of Korean Patent Application No. 10-2013-0139997 filed on Nov. 18, 2013 and Korean Patent Application No. 10-2014-0114385 filed on Aug. 29, 2014, all of which are hereby incorporated by reference in their entirety for all purposes as if fully set forth herein.

BACKGROUND OF THE INVENTION (a) Field of the Invention

The present disclosure relates to an olefin-based polymer with excellent processability.

The present application is based on, and claims priority from Korean Patent Application Nos. 10-2013-0139997 and 10-2014-0114385, filed on Nov. 18, 2013 and Aug. 29, 2014, the disclosure of which is hereby incorporated by reference herein in its entirety.

(b) Description of the Related Art

Olefin polymerization catalyst systems may be divided into Ziegler-Natta and metallocene catalyst systems, and these two highly active catalyst systems have been developed in accordance with their characteristics. The Ziegler-Natta catalyst has been widely applied to commercial processes since it was developed in the 1950's. However, since the Ziegler-Natta catalyst is a multi site catalyst with several different active sites, it is characterized by producing polymers with a broad molecular weight distribution. Also, since compositional distribution of comonomers is not uniform, it is difficult to provide the desired physical properties.

Meanwhile, the metallocene catalyst includes a main catalyst whose main component is a transition metal compound and an organometallic compound cocatalyst whose main component is aluminum. Such a catalyst is a homogeneous complex catalyst and a single-site catalyst, and offers a polymer having a narrow molecular weight distribution and uniform compositional distribution of comonomers, depending on the single site characteristics. The stereoregularity, copolymerization characteristics, molecular weight, crystallinity, and so forth of the polymer may be controlled by changing a ligand structure of the catalyst and polymerization conditions.

U.S. Pat. No. 5,914,289 describes a method of controlling the molecular weight and the molecular weight distribution of polymers using metallocene catalysts which are respectively supported on supports. A large amount of solvent and a long preparation time are required for preparing the supported catalysts, and the process of supporting metallocene catalysts on the respective supports is troublesome.

Korean Patent Application No. 2003-12308 discloses a method of controlling the molecular weight distribution by polymerizing polymers while changing a combination of catalysts in a reactor by supporting a dinuclear metallocene catalyst and a mononuclear metallocene catalyst on a support together with an activating agent. However, this method is limited in simultaneous implementation of properties of the respective catalysts. In addition, there is a disadvantage that a metallocene catalyst portion is departed from a final supported catalyst to cause fouling in the reactor.

Therefore, to solve the above drawbacks, there is a continuous demand for a method of preparing olefin-based polymers with the desired physical properties by easily preparing a hybrid supported metallocene catalyst with an excellent activity.

Meanwhile, linear low-density polyethylene is prepared by copolymerization of ethylene and alpha olefin at a low pressure using a polymerization catalyst, and is a resin having a narrow molecular weight distribution and short chain branches with a predetermined length, along with the lack of long chain branches. Linear low-density polyethylene films have high strength at break and elongation, and excellent tear strength and falling weight impact strength, in addition to general characteristics of polyethylene, and therefore, their use is growing in the fields of stretch films, overwrap films, etc., to which the existing low-density polyethylene or high-density polyethylene has been hardly applied.

A preparation process of linear low-density polyethylene using 1-butene or 1-hexene as a comonomer is generally performed in a single gas phase reactor or a single loop slurry reactor, and its productivity is higher than a process using 1-octene comonomers. However, due to limitations of catalyst and process technologies, the product has physical properties inferior to those of a product obtained by using 1-octene comonomers, and has a narrow molecular weight distribution to show poor processability. Many efforts have been made to improve these problems.

U.S. Pat. No. 4,935,474 discloses a method of preparing polyethylene with a broad molecular weight distribution by using two or more metallocene compounds. U.S. Pat. No. 6,828,394 discloses a method of preparing polyethylene having excellent processability, and in particular, being suitable for films by using a mixture of a "good comonomer incorporator" and a "poor comonomer incorporator". In addition, U.S. Pat. Nos. 6,841,631 and 6,894,128 disclose that polyethylene having a bimodal or multimodal molecular weight distribution is prepared by using a metallocene catalyst containing at least two metal compounds, thereby being applied to films, blow molded products, pipes, etc. However, even though these products have improved processability, the dispersion state according to the molecular weight in a unit particle is not uniform, and thus appearance is rough and physical properties are not stable under relatively desirable extrusion conditions.

Under this background, there is a continuous demand for an excellent product in which a balance between physical properties and processability is ensured, and improvement thereof is further required.

SUMMARY OF THE INVENTION

In order to solve problems of the prior art, the present invention provides an olefin-based polymer with excellent processability and improved transparency and mechanical properties.

According to an aspect of the present invention, provided is an olefin-based polymer having a molecular weight distribution (Mw/Mn) of 3 to 20;

a melt flow rate ratio (MFR10/MFR2) of 9 to 15, which is measured at 190° C. in accordance with ASTM1238; and a slope of −0.55 to −0.35 in a curve of complex viscosity ($\eta^*$[Pa·s]) versus frequency ($\omega$[rad/s]).

According to another aspect of the present invention, provided is a film including the olefin-based polymer.

The olefin-based polymer according to the present invention has excellent processability, mechanical properties and transparency, thereby being usefully applied to films, etc.

BRIEF DESCRIPTION OF THE DRAWINGS

FIG. 1 is a graph showing a relationship between frequency and complex viscosity of olefin-based polymers according to Examples and Comparative Examples of the present invention; and FIG. 2 is a graph of GPC-FTIR measurement showing a molecular weight distribution of an olefin-based polymer according to an exemplary embodiment of the present invention.

DETAILED DESCRIPTION OF THE EMBODIMENTS

Hereinafter, the present invention will be described in more detail.

An olefin-based polymer according to the present invention is characterized by having a molecular weight distribution (Mw/Mn) of 3 to 20, a melt flow rate ratio (MFR10/MFR2) of 9 to 15, which is measured at 190° C. in accordance with ASTM123, and a slope of −0.55 to −0.35 in a curve of complex viscosity (n*[Pa·s]) versus frequency (ω[rad/s]).

The olefin-based polymer of the present invention may exhibit a broad molecular weight distribution (Mw/Mn, PDI) of about 3 to about 20, preferably about 4 to about 15, thereby showing excellent processability.

According to an embodiment of the present invention, the olefin-based polymer may have a weight average molecular weight (Mw) of about 50,000 to about 200,000 g/mol, preferably about 60,000 to about 150,000 g/mol, but is not limited thereto. The olefin-based polymer of the present invention may have a high molecular weight and a broad molecular weight distribution and excellent physical properties and processability.

In other words, the olefin-based polymer of the present invention may exhibit a broad molecular weight distribution and melt flow rate ratio (MFRR), compared to the known olefin-based copolymers, and thus has remarkably increased flowability to show more excellent processability.

The olefin-based polymer of the present invention may have a melt flow rate ratio (MFRR, MFR10/MFR2) ranging from about 9 to about 15, preferably about 9.5 to about 13. The olefin-based polymer of the present invention may have the melt flow rate ratio within the above range, and therefore, flowability under each load may be properly controlled to improve processability and mechanical properties at the same time.

According to an embodiment of the present invention, $MFR_2$ (a melt flow rate measured in accordance with ASTM D-1238 at 190° C. under a load of 2.16 kg) may be in the range of about 0.1 to about 10 g/10 min, and preferably about 0.2 to about 5 g/10 min. Further, according to an embodiment of the present invention, $MFR_{10}$ (a melt flow rate measured in accordance with ASTM D-1238 at 190° C. under a load of 10 kg) may be in the range of about 0.9 to about 150 g/10 min, and preferably about 1.9 to about 65 g/10 min. Such ranges of $MFR_2$ and $MFR_{10}$ may be properly controlled in consideration of use or application fields of the olefin-based polymer.

Further, the olefin-based polymer of the present invention has a slope in the range of about −0.55 to about −0.35 or about −0.45 to about −0.35 in a curve of complex viscosity (η*[Pa·s]) versus frequency (ω[rad/s]). The curve of complex viscosity versus frequency is related to flowability, and a high complex viscosity at a low frequency and a low complex viscosity at a high frequency represent high flowability. That is, the slope is negative, and a higher absolute value of the slope may represent higher flowability. The olefin-based polymer of the present invention has a slope ranging from about −0.55 to about −0.35 in the curve of complex viscosity versus frequency, and it exhibits remarkably high flowability, compared to the previous olefin-based polymer having similar density and weight average molecular weight. This is related to the broad molecular weight distribution of the olefin-based polymer of the present invention. For this reason, the polymer may have a superior shear thinning effect despite its high melt index, thereby showing excellent flowability and processability.

According to an embodiment of the present invention, the olefin-based polymer may have a density of 0.910 to 0.940 g/cm³, but is not limited thereto.

Further, according to an embodiment of the present invention, the olefin-based polymer may have the highest SCB content value within a molecular weight distribution range of 0.2 to 0.8, when a weight average molecular weight (M) measured by GPC-FTIR is taken as 0.5.

SCB (Short Chain Branching) refers to branches having 2 to 6 carbon atoms, which attached to a main chain of the olefin-based polymer, and generally, refers to side chains produced by using alpha olefin having 4 or more carbon atoms, such as 1-butene, 1-hexene, 1-octene, etc., as a comonomer.

In general, GPC-FTIR spectroscopy may be used to measure the molecular weight, molecular weight distribution, and SCB content, simultaneously or sequentially.

The olefin-based polymer of the present invention is characterized by having the highest SCB content value within a molecular weight distribution range of 0.2 to 0.8, when a weight average molecular weight (M) measured by GPC-FTIR is taken as 0.5.

FIG. 2 is a graph of GPC-FTIR measurement showing a molecular weight distribution of an olefin-based polymer according to an exemplary embodiment of the present invention.

Referring to FIG. 2, in the molecular weight distribution graph, the highest SCB content value (arrow) appears in the middle region of the molecular weight distribution centered around the point of the weight average molecular weight (M). That is, when the point of the weight average molecular weight (M) is taken as 0.5, the point of the lowest molecular weight value is taken as 0, and the point of the highest molecular weight value is taken as 1, the highest SCB content value (arrow) may appear within the region of 0.2 to 0.8 on the log graph. In particular, the highest SCB content value may appear not as a divergent value, but as an inflection point. Such characteristics of the molecular weight distribution indicate that the olefin-based polymer of the present invention shows the highest comonomer inflow in the middle molecular weight region, that is, in the left and right 30% regions of the molecular weight distribution from the weight average molecular weight as the center, and also shows lower comonomer inflow in the lower 20% of the low molecular weight region and in the upper 20% of the high molecular weight region than in the middle molecular weight region.

The olefin-based polymer of the present invention may have the SCB content of 5 to 30, and preferably 7 to 20 per 1000 carbons of the olefin-based polymer.

In general, the olefin-based polymer has a disadvantage that as the molecular weight distribution becomes wider, processability is improved, but a haze property is deteriorated to decrease transparency. However, the olefin-based polymer of the present invention has a good haze property due to the above comonomer distribution property to show high transparency even though it has a broad molecular weight distribution.

Accordingly, the olefin-based polymer of the present invention may have excellent flowability, processability, transparency, etc., thereby being applied to various fields according to its use, and in particular, providing films having improved physical properties.

The olefin-based polymer according to the present invention may be a homopolymer of ethylene as an olefin-based monomer, or preferably, a copolymer of ethylene and alpha olefin-based comonomer.

The alpha olefin-based comonomer may be alpha olefin having 4 or more carbon atoms. The alpha olefin having 4 or more carbon atoms may be 1-butene, 1-pentene, 1-hexene, 4-methyl-1-pentene, 1-octene, 1-decene, 1-dodecene, 1-tetradecene, 1-hexadecene, 1-octadecene, 1-eicosen, etc., but is not limited thereto. Among them, alpha olefin having 4~10 carbon atoms is preferred, and one kind or several kinds of alpha olefins may be also used as a comonomer.

In the copolymer of ethylene and alpha olefin-based comonomer, the content of the alpha olefin-based comonomer may be about 5 to about 20% by weight, and preferably, about 7 to about 15% by weight, but is not limited thereto.

The above olefin-based polymer may be prepared by using a hybrid metallocene catalyst.

According to an embodiment of the present invention, the hybrid metallocene catalyst may be a hybrid supported metallocene catalyst including a first metallocene compound represented by the following Chemical Formula 1; a second metallocene compound including one or more selected from compounds represented by the following Chemical Formula 2 and Chemical Formula 3; a cocatalyst compound; and a support.

[Chemical Formula 1]

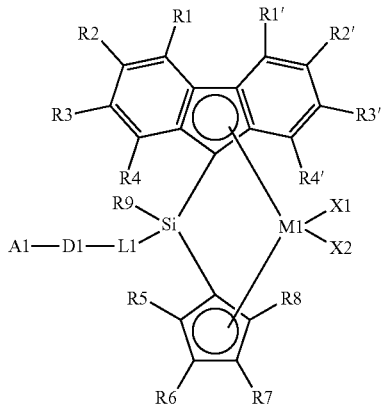

wherein R1 to R4, R9 and R1' to R4' may be the same as or different from each other, and each independently hydrogen, halogen, a C1 to C20 alkyl group, a C2 to C20 alkenyl group, a C6 to C20 aryl group, a C7 to C20 alkylaryl group, or a C7 to C20 arylalkyl group;

R5 to R8 may be the same as or different from each other, and each independently hydrogen, a C1 to C20 alkyl group, a C2 to C20 alkenyl group, a C6 to C20 aryl group, a C7 to C20 alkylaryl group, or a C7 to C20 arylalkyl group, and two adjacent groups of R5 to R8 may be connected to each other to form one or more aliphatic rings, aromatic rings, or hetero rings;

L1 may be a linear or branched C1 to C10 alkylene group;

D1 may be —O—, —S—, —N(R)— or —Si(R)(R')—, in which R and R' may be the same as or different from each other, and each independently hydrogen, halogen, a C1 to C20 alkyl group, a C2 to C20 alkenyl group, or a C6 to C20 aryl group;

A1 may be hydrogen, halogen, a C1 to C20 alkyl group, a C2 to C20 alkenyl group, a C6 to C20 aryl group, a C7 to C20 alkylaryl group, a C7 to C20 arylalkyl group, a C1 to C20 alkoxy group, a C2 to C20 alkoxyalkyl group, a C2 to C20 heterocycloalkyl group, or a C5 to C20 heteroaryl group;

M1 may be a Group 4 transition metal;

X1 and X2 may be the same as or different from each other, and each independently halogen, a C1 to C20 alkyl group, a C2 to C20 alkenyl group, a C6 to C20 aryl group, a nitro group, an amido group, a C1 to C20 alkylsilyl group, a C1 to C20 alkoxy group, or a C1 to C20 sulfonate group;

[Chemical Formula 2]

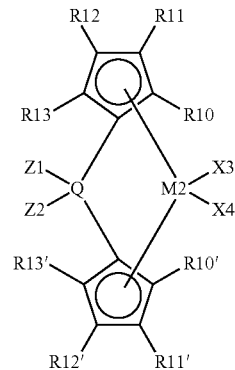

wherein R10 to R13 and R10' to R13' may be the same as or different from each other, and each independently hydrogen, a C1 to C20 alkyl group, a C2 to C20 alkenyl group, a C6 to C20 aryl group, a C7 to C20 alkylaryl group, a C7 to C20 arylalkyl group, or a C1 to C20 amine group, and two adjacent groups of R10 to R13 and R10' to R13' may be connected to each other to form one or more aliphatic rings, aromatic rings, or hetero rings;

Z1 and Z2 may be the same as or different from each other, and each independently hydrogen, a C1 to C20 alkyl group, a C3 to C20 cycloalkyl group, a C1 to C20 alkoxy group, a C6 to C20 aryl group, a C6 to C10 aryloxy group, a C2 to C20 alkenyl group, a C7 to C40 alkylaryl group, or a C7 to C40 arylalkyl group;

Q may be a C1 to C20 alkylene group, a C3 to C20 cycloalkylene group, a C6 to C20 arylene group, a C7 to C40 alkylarylene group, or a C7 to C40 arylalkylene group;

M2 may be a Group 4 transition metal;

X3 and X4 may be the same as or different from each other, and each independently halogen, a C1 to C20 alkyl group, a C2 to C20 alkenyl group, a C6 to C20 aryl group, a nitro group, an amido group, a C1 to C20 alkylsilyl group, a C1 to C20 alkoxy group, or a C1 to C20 sulfonate group;

[Chemical Formula 3]

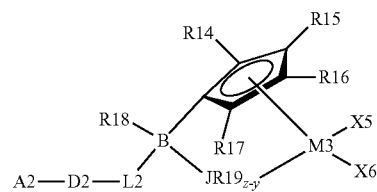

wherein M3 may be a Group 4 transition metal;

X5 and X6 may be the same as or different from each other, and each independently halogen, a C1 to C20 alkyl group, a C2 to C20 alkenyl group, a C6 to C20 aryl group, a nitro group, an amido group, a C1 to C20 alkylsilyl group, a C1 to C20 alkoxy group, or a C1 to C20 sulfonate group;

R14 to R19 may be the same as or different from each other, and each independently hydrogen, a C1 to C20 alkyl group, a C2 to C20 alkenyl group, a C1 to C20 alkoxy group, a C6 to C20 aryl group, a C7 to C20 alkylaryl group, a C7 to C20 arylalkyl group, a C1 to C20 alkylsilyl, a C6 to C20 arylsilyl group, or a C1 to C20 amine group, and two or more adjacent groups of R14 to R17 may be connected to each other to form one or more aliphatic rings, aromatic rings, or hetero rings;

L2 may be a linear or branched C1 to C10 alkylene group;

D2 may be —O—, —S—, —N(R)— or —Si(R)(R')—, in which R and R' may be the same as or different from each other, and each independently hydrogen, halogen, a C1 to C20 alkyl group, a C2 to C20 alkenyl group, or a C6 to C20 aryl group;

A2 may be hydrogen, halogen, a C1 to C20 alkyl group, a C2 to C20 alkenyl group, a C6 to C20 aryl group, a C7 to C20 alkylaryl group, a C7 to C20 arylalkyl group, a C1 to C20 alkoxy group, a C2 to C20 alkoxyalkyl group, a C2 to C20 heterocycloalkyl group, or a C5 to C20 heteroaryl group;

B may be carbon, silicon, or germanium, and may be a bridge connecting a cyclopentadienyl ligand and JR19z-y via a covalent bond;

J may be an element in Group 15 or 16 of the periodic table;

z may be the number of oxidation of J element; and y may be the bonding number of J element.

In the metallocene compound according to the present invention, the substituents of Chemical Formulae 1 to 3 will be explained in more detail as follows.

The C1 to C20 alkyl group may include a linear or branched alkyl group, and may be specifically exemplified by a methyl group, an ethyl group, a propyl group, an isopropyl group, an n-butyl group, a tert-butyl group, a pentyl group, a hexyl group, a heptyl group, an octyl group, etc., but is not limited thereto.

The C2 to C20 alkenyl group may include a linear or branched alkenyl group, and may be specifically exemplified by an allyl group, an etenyl group, a prophenyl group, a butenyl group, a pentenyl group, etc., but is not limited thereto.

The C6 to C20 aryl group may include a single- or condensed-ring aryl group, and may be specifically exemplified by a phenyl group, a biphenyl group, a naphthyl group, a phenanthrenyl group, a fluorenyl group, etc., but is not limited thereto.

The C5 to C20 heteroaryl group may include a single- or condensed-ring heteroaryl group, and may be specifically exemplified by a carbazolyl group, a pyridyl group, a quinoline group, an isoquinoline group, a thiophenyl group, a furanyl group, an imidazole group, an oxazolyl group, a thiazolyl group, a triazine group, a tetrahydropyranyl group, a tetrahydrofuranyl group, etc., but is not limited thereto.

The C1 to C20 alkoxy group may be exemplified by a methoxy group, an ethoxy group, a phenyloxy group, a cyclohexyloxy group, etc., but is not limited thereto.

The Group 4 transition metal may be exemplified by titanium, zirconium, hafnium, etc., but is not limited thereto.

In the hybrid supported metallocene catalyst according to the present invention, R1 to R9 and R1' to R8' of Chemical Formula 1 are more preferably each independently hydrogen, a methyl group, an ethyl group, a propyl group, an isopropyl group, an n-butyl group, a tert-butyl group, a pentyl group, a hexyl group, a heptyl group, an octyl group, or a phenyl group, but are not limited thereto.

In the hybrid supported metallocene catalyst according to the present invention, L1 of Chemical Formula 1 is more preferably a linear or branched C4 to C8 alkylene group, but is not limited thereto. Furthermore, the alkylene group may be unsubstituted or substituted with a C1 to C20 alkyl group, a C2 to C20 alkenyl group, or a C6 to C20 aryl group.

In the hybrid supported metallocene catalyst according to the present invention, A1 of Chemical Formula 1 is more preferably hydrogen, a methyl group, an ethyl group, a propyl group, an isopropyl group, an n-butyl group, a tert-butyl group, a methoxymethyl group, a tert-butoxymethyl group, a 1-ethoxyethyl group, a 1-methyl-1-methoxyethyl group, a tetrahydropyranyl group, or a tetrahydrofuranyl group, but is not limited thereto.

According to an embodiment of the present invention, specific examples of the first metallocene compound represented by Chemical Formula 1 may include compounds represented by the following Chemical Formulae, but are not limited thereto:

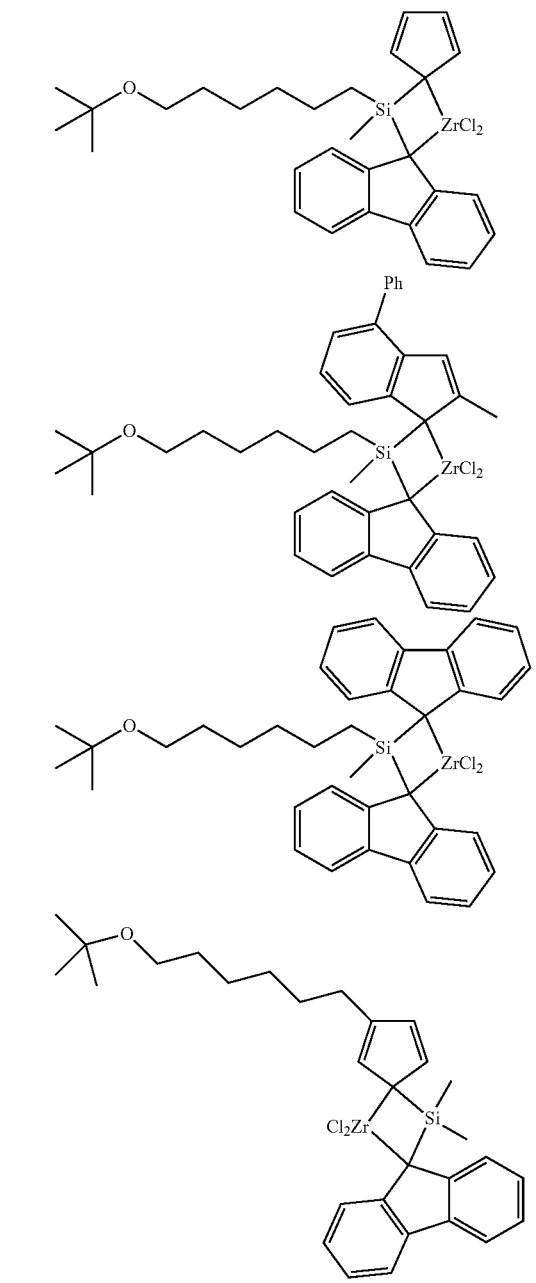

-continued

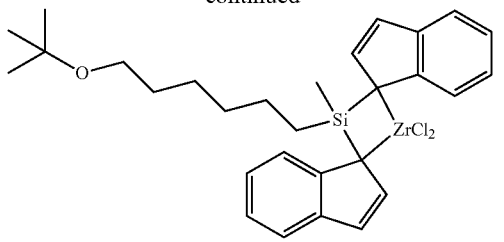

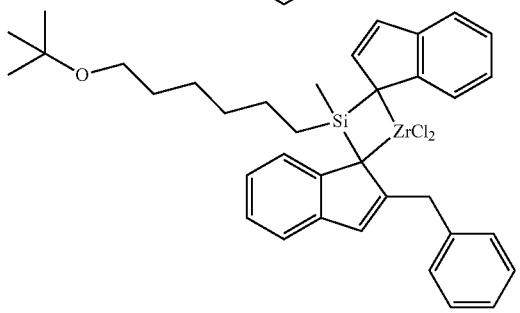

In the hybrid supported metallocene catalyst according to the present invention, Q of Chemical Formula 2 may be a C1 to C20 alkylene group, Z1 and Z2 may be each independently hydrogen, a C1 to C20 alkyl group, or a C1 to C20 alkoxy group, and X3 and X4 may be halogen, but they are not limited thereto.

According to an embodiment of the present invention, specific examples of the second metallocene compound represented by Chemical Formula 2 may include compounds represented by the following Chemical Formulae, but are not limited thereto:

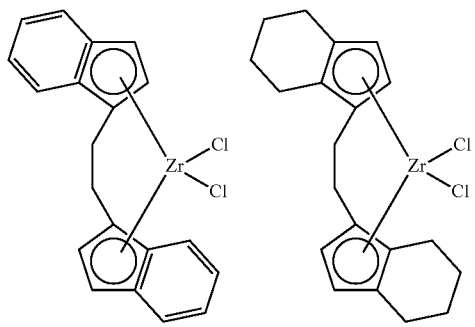

In the hybrid supported metallocene catalyst according to the present invention, L2 of Chemical Formula 3 is more preferably a linear or branched C4 to C8 alkylene group, but is not limited thereto. Further, the alkylene group may be unsubstituted or substituted with a C1 to C20 alkyl group, a C2 to C20 alkenyl group, or a C6 to C20 aryl group.

In the hybrid supported metallocene catalyst according to the present invention, A2 of Chemical Formula 3 is more preferably hydrogen, a methyl group, an ethyl group, a propyl group, an isopropyl group, an n-butyl group, a tert-butyl group, a methoxymethyl group, a tert-butoxymethyl group, a 1-ethoxyethyl group, a 1-methyl-1-methoxyethyl group, a tetrahydropyranyl group, or a tetrahydrofuranyl group, but is not limited thereto.

Further, B and J of Chemical Formula 3 may be silicon and nitrogen, respectively, but are not limited thereto.

Furthermore, R14 to R19 of Chemical Formula 3 may be each independently hydrogen, a C1 to C20 alkyl group, a C2 to C20 alkenyl group, or a C1 to C20 alkoxy group, but are not limited thereto.

Specific examples of the second metallocene compound represented by Chemical Formula 3 may include compounds represented by the following Chemical Formulae, but are not limited thereto:

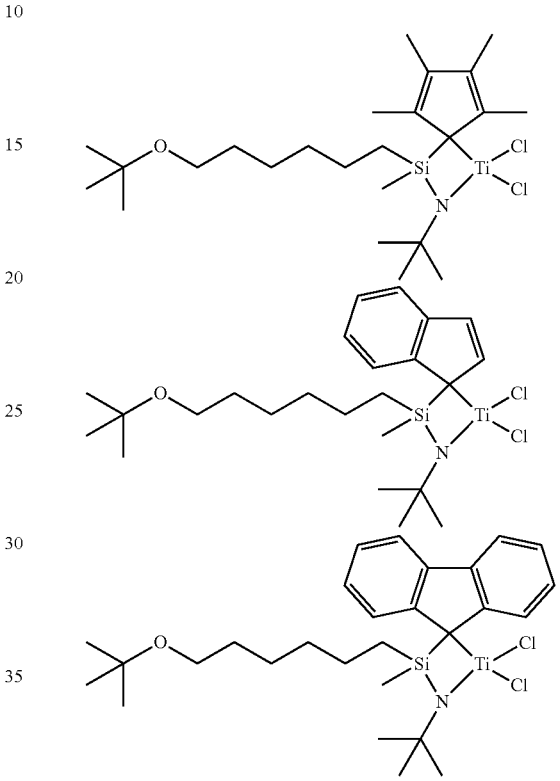

A preparation method of the metallocene compounds represented by Chemical Formulae 1 to 3 is specifically described in the following Examples.

The first metallocene compound of Chemical Formula 1 form a structure, in which a fluorene derivative is crosslinked by a bridge, and it has unshared electron pair which may functions as a Lewis base in a ligand structure, and thus is supported on the surface having a Lewis acid property of a support, thereby showing a high polymerization activity when supported. Further, the metallocene compound includes the electron-rich fluorene group to have high activity, thereby polymerizing a high molecular weight olefin-based polymer.

The hybrid supported metallocene catalyst according to an embodiment of the present invention may be prepared by supporting one or more of the first metallocene compounds represented by Chemical Formula 1 and one or more of the second metallocene compounds selected from the compounds represented by Chemical Formula 2 and Chemical Formula 3 with a cocatalyst compound on a support.

In the hybrid supported metallocene catalyst, the first metallocene compound represented by Chemical Formula 1 may mainly contribute to preparation of a high molecular weight copolymer and the second metallocene compound represented by Chemical Formula 2 may contribute to preparation of a relatively low molecular weight copolymer. Further, the second metallocene compound represented by Chemical Formula 3 may contribute to preparation of a medium molecular weight copolymer.

Therefore, when the hybrid supported metallocene catalyst including three kinds of metallocene compounds by including the respective metallocene compounds of Chemical Formulae 1 to 3 is used, miscibility of high molecular weight and low molecular weight copolymers may be improved to prepare the olefin-based polymer of the present invention which has a broad molecular weight distribution to show improved processability and also has high transparency.

According to an embodiment of the present invention, the hybrid supported metallocene catalyst may include one or more of the first metallocene compounds of Chemical Formula 1 and one or more of the second metallocene compounds of Chemical Formula 2.

According to another embodiment of the present invention, the hybrid supported metallocene catalyst may include one or more of the second metallocene compounds of Chemical Formula 3, in addition to one or more of the first metallocene compounds of Chemical Formula 1 and one or more of the second metallocene compounds of Chemical Formula 2.

Therefore, since the hybrid supported metallocene catalyst of the present invention may include the first metallocene compound represented by Chemical Formula 1 and the second metallocene compound selected from the compounds represented by Chemical Formula 2 and Chemical Formula 3, it may include two or more different metallocene compounds, and preferably, three or more different metallocene compounds. As a result, miscibility of high molecular weight and low molecular weight copolymers may be improved to prepare an olefin polymer which is a high molecular weight olefin-based copolymer and also has a broad molecular weight distribution to show excellent physical properties and processability.

In the hybrid supported metallocene catalyst, the cocatalyst supported on the support in order to activate the metallocene compound may be an organometallic compound containing a Group 13 metal, and any cocatalyst may be used without particular limitation as long as it may be used in the polymerization of olefin in the presence of a common metallocene catalyst.

Specifically, the cocatalyst compound may include one or more of cocatalyst compounds represented by the following Chemical Formulae 4 to 6:

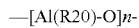—[Al(R20)-O]n-    [Chemical Formula 4]

wherein R20 may be the same as or different from each other, and each independently halogen; C1 to C20 hydrocarbon; or C1 to C20 hydrocarbon substituted with halogen;
n is an integer of 2 or more;

D(R20)$_3$    [Chemical Formula 5]

wherein R20 may be the same as defined in Chemical Formula 4;
D is aluminum or boron;

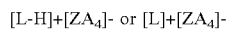[L-H]+[ZA$_4$]- or [L]+[ZA$_4$]-    [Chemical Formula 6]

wherein L may be a neutral or cationic Lewis acid; H may be a hydrogen atom; Z may be a Group 13 element; A may be the same as or different from each other, and each independently a C6 to C20 aryl group or a C1 to C20 alkyl group in which one or more hydrogen atoms are unsubstituted or substituted with halogen, C1 to C20 hydrocarbon, alkoxy, or phenoxy.

The compound represented by Chemical Formula 4 may be exemplified by methyl aluminoxane, ethyl aluminoxane, isobutyl aluminoxane, butyl aluminoxane, etc., and a more preferred compound is methyl aluminoxane.

The compound represented by Chemical Formula 5 may be exemplified by trimethyl aluminum, triethyl aluminum, triisobutyl aluminum, tripropyl aluminum, tributyl aluminum, dimethylchloro aluminum, triisopropyl aluminum, tris-butyl aluminum, tricyclopentyl aluminum, tripentyl aluminum, triisopentyl aluminum, trihexyl aluminum, trioctyl aluminum, ethyldimethyl aluminum, methyldiethyl aluminum, triphenyl aluminum, tri-p-tolyl aluminum, dimethyl aluminum methoxide, dimethyl aluminum ethoxide, trimethyl boron, triethyl boron, triisobutyl boron, tripropyl boron, tributyl boron, etc., and a more preferred compound is selected from trimethyl aluminum, triethyl aluminum, and triisobutyl aluminum.

The compound represented by Chemical Formula 6 may be exemplified by triethylammoniumtetraphenylboron, tributylammoniumtetraphenylboron, trimethylammoniumtetraphenylboron, tripropylammoniumtetraphenylboron, trimethylammoniumtetra(p-tolyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetrapentafluorophenylboron, N,N-diethylaniliniumtetraphenylboron, N,N-diethylaniliniumtetrapentafluorophenylboron, diethylammoniumtetrapentafluorophenylboron, triphenylphosphoniumtetraphenylboron, trimethylphosphoniumtetraphenylboron, triethylammoniumtetraphenylaluminum, tributylammoniumtetraphenylaluminum, trimethylammoniumtetraphenylaluminum, tripropylammoniumtetraphenylaluminum, trimethylammoniumtetra(p-tolyl)aluminum, tripropylammoniumtetra(p-tolyl)aluminum, triethylammoniumtetra(o,p-dimethylphenyl)aluminum, tributylammoniumtetra(p-trifluoromethylphenyl)aluminum, trimethylammoniumtetra(p-trifluoromethylphenyl)aluminum, tributylammoniumtetrapentafluorophenylaluminum, N,N-diethylaniliniumtetraphenylaluminum, N,N-diethylaniliniumtetrapentafluorophenylaluminum, diethylammoniumtetrapentatetraphenylaluminum, triphenylphosphoniumtetraphenylaluminum, trimethylphosphoniumtetraphenylaluminum, tripropylammoniumtetra(p-tolyl)boron, triethylammoniumtetra(o,p-dimethylphenyl)boron, tributylammoniumtetra(p-trifluoromethylphenyl)boron, triphenylcarboniumtetra(p-trifluoromethylphenyl)boron, triphenylcarboniumtetrapentafluorophenylboron, etc.

In the hybrid supported metallocene catalyst, a weight ratio of the transition metals of the first and second metallocene compounds to the support is preferably 1:1 to 1:1,000. When the support and the metallocene compound are included in the above weight ratio, the supported catalyst may exhibit a proper catalytic activity, and thus it is advantageous in terms of maintenance of the catalytic activity and economic efficiency.

Further, a weight ratio of the cocatalyst compound of Chemical Formula 4 or 5 to the support is preferably 1:20 to 20:1, and a weight ratio of the cocatalyst compound of Chemical Formula 6 to the support is preferably 1:10 to 100:1.

Further, a weight ratio of the first metallocene compound to the second metallocene compound is preferably 1:100 to 100:1. When the cocatalyst and the metallocene compound are included in the above weight ratio, the supported catalyst may exhibit a proper catalytic activity, and thus it is advantageous in terms of maintenance of the catalytic activity and economic efficiency.

In the hybrid supported metallocene catalyst, the support may be a support containing hydroxyl groups on the surface, and preferably, a support containing highly reactive hydroxyl groups and siloxane groups on the surface, from which water is removed by drying.

For example, silica, silica-alumina, and silica-magnesia dried at a high temperature may be used, and they may generally contain oxides such as $Na_2O$, $K_2CO_3$, $BaSO_4$, and $Mg(NO_3)_2$, etc., carbonates, sulfates, and nitrates.

Further, the drying temperature of the support may be preferably about 100 to 800° C. If the drying temperature of the support is lower than 100° C., an excessive amount of water on the surface of the support reacts with the cocatalyst, and if the drying temperature is higher than 800° C., pores of the support surface combine with each other to reduce the surface area and the amount of hydroxyl group becomes too low and only siloxane groups remain on the support surface to reduce the reactive site with the cocatalyst, which is not preferable.

The amount of the hydroxyl groups of the support surface is preferably about 0.1 to 10 mmol/g, and more preferably about 0.2 to 5 mmol/g. The amount of the hydroxyl groups on the support surface may be controlled by preparation processes and conditions or drying conditions of the support, e.g., temperature, time, vacuum or spray drying, etc.

The amount of hydroxyl group is less than 0.1 mmol/g, the reactive sites with cocatalyst are reduced. If the amount of hydroxyl group is more than 10 mmol/g, the hydroxyl groups may come from moisture, in addition to hydroxyl groups being present on the support particle surface, which is not preferable.

The hybrid supported metallocene catalyst may be prepared by the steps of supporting the cocatalyst compound on a support, supporting the first metallocene compound on the support, and supporting the second metallocene compound on the support. In the preparation method of the hybrid supported metallocene catalyst, the order of supporting the first and second metallocene compounds may be changed, if necessary. That is, the first metallocene compound may be first supported on the support, and then the second metallocene compound may be additionally supported thereon to prepare the hybrid supported metallocene catalyst, or the second metallocene compound may be first supported on the support, and then the first metallocene compound may be supported thereon. Alternatively, the first and second metallocene compounds may be injected and supported at the same time.

Upon preparation of the hybrid supported metallocene catalyst, hydrocarbon solvents such as pentane, hexane, heptane, etc., or aromatic solvents such as benzene, toluene, etc. may be used as a reaction solvent. Further, the metallocene compound and the cocatalyst compound may be used in the form of being supported on silica or alumina.

The olefin-based polymer according to the present invention may be prepared by polymerizing olefin-based monomers in the presence of the above described hybrid supported metallocene catalyst.

In the preparation method of the olefin-based polymer, specific examples of the olefin-based monomer may include ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosen, etc., and two or more thereof may be mixed and copolymerized.

The olefin-based polymer is more preferably an ethylene/alpha olefin copolymer, but is not limited thereto.

If the olefin-based polymer is the ethylene/alpha olefin copolymer, the content of alpha olefin as a comonomer is not particularly limited, and it may be adequately selected according to the use or purpose of the olefin-based polymer. More specifically, the content may be from more than 0 to 99 mole % or less.

The polymerization reaction may be performed by homopolymerization of single olefin-based monomers or by copolymerization of two or more kinds of monomers using a continuous slurry polymerization reactor, a loop slurry reactor, a gas phase reactor, or a solution reactor.

The hybrid supported metallocene catalyst may be injected after being dissolved or diluted in an aliphatic hydrocarbon solvent having 5 to 12 carbon atoms, for example, pentane, hexane, heptane, nonane, decane, and isomers thereof, an aromatic hydrocarbon solvent such as toluene and benzene, a chlorine-substituted hydrocarbon solvent such as dichloromethane and chlorobenzene, etc. The solvent used herein may be preferably treated with a trace amount of alkyl aluminum to remove catalytic poisons such as water, air, etc. The polymerization may be also performed by further using the cocatalyst.

An olefin-based copolymer having a bimodal or multimodal molecular weight distribution curve may be prepared by using the hybrid supported metallocene catalyst. When the hybrid supported metallocene catalyst is used, an olefin-based polymer having a relatively high molecular weight may be prepared by the first metallocene compound, and an olefin-based polymer having a relatively low molecular weight may be prepared by the second metallocene compound. In particular, when the hybrid supported metallocene catalyst includes one or more of the first metallocene compounds of Chemical Formula 1, one or more of the second metallocene compounds of Chemical Formula 2, and one or more of the second metallocene compounds represented by Chemical Formula 3, olefin-based polymers having a high molecular weight, a low molecular weight, and a medium molecular weight are produced, thereby preparing an olefin-based polymer having a broad molecular weight distribution and also having high transparency due to improved miscibility between the high molecular weight and low molecular weight polymers.

In polymerization using the hybrid supported metallocene catalyst of the present invention, a polymerization temperature may be about 25 to about 500° C., preferably about 25 to about 200° C., and more preferably about 50 to about 150° C. Further, a polymerization pressure may be about 1 to about 100 $Kgf/cm^2$, preferably about 1 to about 70 $Kgf/cm^2$, and more preferably about 5 to about 50 $Kgf/cm^2$.

The olefin-based polymer according to the present invention may be prepared by homopolymerization of ethylene or by copolymerization of ethylene and alpha olefin using the above hybrid supported metallocene compound as a catalyst, thereby having a high molecular weight and a broad molecular weight distribution.

Accordingly, the olefin-based polymer of the present invention may have excellent mechanical properties such as tensile strength, tear strength, etc., processability, Haze, thereby being applied to various fields according to its use, and in particular, providing films having improved physical properties.

Hereinafter, the preferred Examples are provided for better understanding. However, these Examples are for illustrative purposes only, and the invention is not intended to be limited by these Examples.

EXAMPLE

Synthesis Example 1

Preparation Example of First Metallocene Compound

Preparation of (tert-Bu-O—$(CH_2)_6$)MeSi(9-$C_{13}H_9$)$_2$ZrCl$_2$

1) Preparation of Ligand Compound 1.0 mole of a Grignard reagent, tert-Bu-O—$(CH_2)_6$MgCl solution was obtained from a reaction between tert-Bu-O—$(CH_2)_6$Cl compound and Mg(0) in a THF solvent. The Grignard reagent thus prepared was added to a flask containing a MeSiCl$_3$ compound (176.1 mL, 1.5 mol) and THF (2.0 mL) at −30° C., and stirred at room temperature for 8 hours or longer. Then, a filter solution was dried under vacuum to obtain a tert-Bu-O—$(CH_2)_6$SiMeCl$_2$ compound (yield: 92%).

Fluorene (3.33 g, 20 mmol), hexane (100 mL) and MTBE (methyl tert-butyl ether, 1.2 mL, 10 mmol) were added to a reactor at −20° C., and 8 ml of n-BuLi (2.5 M in Hexane) was slowly added thereto, followed by stirring at room temperature for 6 hours. After completing the stirring, the reactor temperature was cooled to −30° C., and a fluorenyl lithium solution thus prepared was slowly added over 1 hour to a tert-Bu-O—$(CH_2)_6$SiMeCl$_2$ (2.7 g, 10 mmol) solution dissolved in hexane (100 ml) at −30° C. After stirring at room temperature for 8 hours or longer, the solution was extracted by adding water, and evaporated to obtain a (tert-Bu-O—$(CH_2)_6$)MeSi(9-$C_{13}H_{10}$)$_2$ compound (5.3 g, yield: 100%). A structure of the ligand was identified by 1H-NMR.

1H NMR (500 MHz, CDCl$_3$): −0.35 (MeSi, 3H, s), 0.26 (Si—CH$_2$, 2H, m), 0.58 (CH$_2$, 2H, m), 0.95 (CH$_2$, 4H, m), 1.17 (tert-BuO, 9H, s), 1.29 (CH$_2$, 2H, m), 3.21 (tert-BuO—CH$_2$, 2H, t), 4.10 (Flu-9H, 2H, s), 7.25 (Flu-H, 4H, m), 7.35 (Flu-H, 4H, m), 7.40 (Flu-H, 4H, m), 7.85 (Flu-H, 4H, d).

2) Preparation of Metallocene Compound 4.8 ml of n-BuLi (2.5M in Hexane) was slowly added to a (tert-Bu-O—$(CH_2)_6$)MeSi(9-$C_{13}H_{10}$)$_2$ (3.18 g, 6 mmol)/MTBE (20 mL) solution at −20° C. The solution was reacted for 8 hours or longer while raising temperature to room temperature. Then, a dilithium salt slurry solution thus prepared was slowly added to a slurry solution of ZrCl$_4$(THF)$_2$ (2.26 g, 6 mmol)/hexane (20 mL) at −20° C., and they were further reacted at room temperature for 8 hours. Precipitates were filtered and washed with hexane several times to obtain a red solid (tert-Bu-O—$(CH_2)_6$)MeSi(9-$C_{13}H_9$)$_2$ZrCl$_2$ compound (4.3 g, yield 94.5%).

1H NMR (500 MHz, C6D6): 1.15 (tert-BuO, 9H, s), 1.26 (MeSi, 3H, s), 1.58 (Si—CH2, 2H, m), 1.66 (CH2, 4H, m), 1.91 (CH2, 4H, m), 3.32 (tert-BuO-CH2, 2H, t), 6.86 (Flu-H, 2H, t), 6.90 (Flu-H, 2H, t), 7.15 (Flu-H, 4H, m), 7.60 (Flu-H, 4H, dd), 7.64 (Flu-H, 2H, d), 7.77 (Flu-H, 2H, d)

Synthesis Example 2

Preparation of Second Metallocene Compound

A 1, 2-ethylene bis(indenyl)ZrCl$_2$ compound was synthesized according to a method described in J. AM. CHEM. SOC. VOL. 126, No. 46, 2004 pp. 15231-15244.

Synthesis Example 3

Preparation of Second Metallocene Compound

Preparation of tBu-O—$(CH_2)_6$)(CH$_3$)Si(C$_5$(CH$_3$)$_4$)(tBu-N)TiCl$_2$ 50 g of Mg(s) was added to a 10 L-reactor at room temperature, and then 300 mL of THF was added thereto. About 0.5 g of I$_2$ was added, and the reactor temperature was maintained at 50° C. After the reactor temperature was stabilized, 250 g of 6-t-buthoxyhexyl chloride was added to the reactor using a feeding pump at a rate of 5 mL/min. By adding 6-t-butoxyhexyl chloride, about 4 to 5° C. increase in the reactor temperature was observed. The mixture was stirred for 12 hours while continuously adding 6-t-butoxyhexyl chloride. 12 hours after reaction, a black reaction solution was obtained. 2 mL of the resulting black solution was taken and water was added thereto to obtain an organic layer, which was identified as 6-t-butoxyhexane by 1H-NMR. A successful Grignard reaction was confirmed from 6-t-butoxyhexane. Consequently, 6-t-buthoxyhexyl magnesium chloride was synthesized.

500 g of MeSiCl$_3$ and 1 L of THF were added to a reactor, and then the reactor temperature was cooled to −20° C. 560 g of the synthesized 6-t-buthoxyhexyl magnesium chloride was added to the reactor at a rate of 5 mL/min using a feeding pump. After completing feeding of the Grignard reagent, the mixture was stirred for 12 hours while slowly raising the reactor temperature to room temperature. 12 hours after reaction, production of white MgCl$_2$ salts was observed. 4 L of hexane was added thereto, and salts were removed through labdori to obtain a filter solution. The filter solution thus obtained was added to the reactor, and then hexane was removed at 70° C. to obtain a light yellow liquid. The liquid thus obtained was identified as a desired methyl (6-t-buthoxy hexyl)dichlorosilane compound by 1H-NMR.

1H-NMR (CDCl3): 3.3 (t, 2H), 1.5 (m, 3H), 1.3 (m, 5H), 1.2 (s, 9H), 1.1 (m, 2H), 0.7 (s, 3H)

1.2 mol (150 g) of tetramethylcyclopentadiene and 2.4 L of THF were added to the reactor, and then reactor temperature was cooled to −20° C. 480 mL of n-BuLi was added to the reactor at a rate of 5 mL/min using a feeding pump. After addition of n-BuLi, the mixture was stirred for 12 hours while slowly raising the reactor temperature to room temperature. 12 hours after reaction, an equivalent of methyl (6-t-buthoxy hexyl)dichlorosilane (326 g, 350 mL) was rapidly added to the reactor. The mixture was stirred for 12 hours while slowly raising the reactor temperature to room temperature. Then, the reactor temperature was cooled to 0° C., and then 2 equivalents of t-BuNH$_2$ were added. The mixture was stirred for 12 hours while slowly raising the reactor temperature to room temperature. 12 hours after reaction, THF was removed and 4 L of hexane was added thereto, and salts were removed through labdori to obtain a filter solution. The filter solution was added to the reactor, and then hexane was removed at 70° C. to obtain a yellow solution. The yellow solution thus obtained was identified as a methyl(6-t-buthoxyhexyl)(tetramethylCpH)t-Butylaminosilane) compound by 1H-NMR.

TiCl$_3$(THF)$_3$ (10 mmol) was rapidly added to n-BuLi and the dilithium salt of the ligand at −78° C., which was synthesized from the ligand dimethyl(tetramethylCpH)t-butylaminosilane in the THF solution. The reaction solution was stirred for 12 hours while slowly raising temperature from −78° C. to room temperature. After stirring for 12 hours, an equivalent of PbCl$_2$ (10 mmol) was added to the reaction solution at room temperature, followed by stirring for 12 hours. After stirring for 12 hours, a dark black solution rendering a blue color was obtained. After THF was removed from the produced reaction solution, hexane was added to filter the product. After hexane was removed from the filter solution, the solution was identified by 1H-NMR as (tBu-O—$(CH_2)_6$)(CH$_3$)Si(C$_5$(CH$_3$)$_4$)(tBu-N)TiCl$_2$ which is a desired ([methyl(6-t-buthoxyhexyl)silyl(η5-tetramethylCp)(t-butylamido)]TiCl$_2$).

1H-NMR (CDCl$_3$): 3.3 (s, 4H), 2.2 (s, 6H), 2.1 (s, 6H), 1.8~0.8 (m), 1.4 (s, 9H), 1.2 (s, 9H), 0.7 (s, 3H)

Preparation Example of Hybrid Supported Catalyst

Preparation Example 1

3.0 kg of a toluene solution was added to a 20 L-sus high pressure reactor, and 1,000 g of silica (manufactured by Grace Davison, SP952X, calcined at 200° C.) was injected thereto, followed by stirring while raising the reactor temperature to 40° C. After silica was sufficiently dispersed for 60 minutes, 6.0 kg of a 10 wt % methylaluminoxane(MAO)/toluene solution was injected, and temperature was raised to 60° C., followed by stirring at 200 rpm for 12 hours. The reactor temperature was decreased to 40° C. Then, stirring was stopped, and the solution was allowed to settle for 30 minutes, followed by decantation of the reaction solution. 3.0 kg of toluene was injected, followed by stirring for 10 minutes. Then, stirring was stopped, and the solution was allowed to settle for 30 minutes, followed by decantation of the toluene solution.

2.0 kg of toluene was injected to a reactor, and the metallocene compound of Synthesis Example 1 and 1,000 ml of toluene were put in a flask to prepare a solution, followed by decantation for 30 minutes. The solution of the metallocene compound of Synthesis Example 1/toluene thus prepared was injected to the reactor, followed by stirring at 200 rpm for 90 minutes. Then, stirring was stopped, and the solution was allowed to settle for 30 minutes, followed by decantation of the reaction solution.

2.0 kg of toluene was injected to a reactor, and the metallocene compound of Synthesis Example 2 and 1,500 ml of toluene were put in a flask to prepare a solution, followed by decantation for 30 minutes. The solution of the metallocene compound of Synthesis Example 2/toluene thus prepared was injected to the reactor, followed by stirring at 200 rpm for 90 minutes. Then, the reactor temperature was decreased to room temperature, and stirring was stopped, and the solution was allowed to settle for 30 minutes, followed by decantation of the reaction solution.

2.0 kg of toluene was injected, followed by stirring for 10 minutes. Then, stirring was stopped, and the solution was allowed to settle for 30 minutes, followed by decantation of the toluene solution.

3.0 kg of hexane was injected to a reactor, and hexane slurry was transported to a filter dryer to filter the hexane solution. The solution was dried under reduced pressure at 50° C. for 4 hours to prepare 700 g of a $SiO_2$ hybrid supported catalyst.

Preparation Example 2

3.0 kg of a toluene solution was added to a 20 L-sus high pressure reactor, and 1,000 g of silica (manufactured by Grace Davison, SP2410) was injected thereto, followed by stirring while raising the reactor temperature to 40° C. After silica was sufficiently dispersed for 60 minutes, 5.4 kg of a 10 wt % methylaluminoxane(MAO)/toluene solution was injected, and temperature was raised to 60° C., followed by stirring at 200 rpm for 12 hours. The reactor temperature was decreased to 40° C. Then, stirring was stopped, and the solution was allowed to settle for 30 minutes, followed by decantation of the reaction solution. 3.0 kg of toluene was injected, followed by stirring for 10 minutes. Then, stirring was stopped, and the solution was allowed to settle for 30 minutes, followed by decantation of the toluene solution.

2.0 kg of toluene was injected to a reactor, and the metallocene compound of Synthesis Example 1 and 1,000 ml of toluene were put in a flask to prepare a solution, followed by sonication for 30 minutes. The solution of the metallocene compound of Synthesis Example 1/toluene thus prepared was injected to the reactor, followed by stirring at 200 rpm for 90 minutes. Then, stirring was stopped, and the solution was allowed to settle for 30 minutes, followed by decantation of the reaction solution.

2.0 kg of toluene was injected to a reactor, and the metallocene compound of Synthesis Example 3 and 1,000 ml of toluene were put in a flask to prepare a solution, followed by sonication for 30 minutes. The solution of the metallocene compound of Synthesis Example 3/toluene thus prepared was injected to the reactor, followed by stirring at 200 rpm for 90 minutes. Then, stirring was stopped, and the solution was allowed to settle for 30 minutes, followed by decantation of the reaction solution.

2.0 kg of toluene was injected to a reactor, and the metallocene compound of Synthesis Example 2 and 300 ml of toluene were put in a flask to prepare a solution, followed by sonication for 30 minutes. The solution of the metallocene compound of Synthesis Example 2/toluene thus prepared was injected to the reactor, followed by stirring at 200 rpm for 90 minutes. The reactor temperature was decreased to room temperature, and stirring was stopped, and the solution was allowed to settle for 30 minutes, followed by decantation of the reaction solution.

2.0 kg of toluene was injected, followed by stirring for 10 minutes. Then, stirring was stopped, and the solution was allowed to settle for 30 minutes, followed by decantation of the toluene solution.

3.0 kg of hexane was injected to a reactor, and hexane slurry was transported to a filter dryer to filter the hexane solution. The solution was dried under reduced pressure at 50° C. for 4 hours to prepare 830 g of a $SiO_2$ hybrid supported catalyst.

Example of Olefin Polymerization

Example 1

The hybrid supported metallocene catalyst obtained in Preparation Example 1 was injected to an isobutane slurry loop process continuous reactor (reactor volume: 140 L, reaction flow rate: 7 m/s) to prepare an olefin polymer. As a comonomer, 1-hexene was used, and a reactor pressure was maintained at 40 bar and a polymerization temperature was maintained at 88° C.

Example 2

An olefin polymer was prepared in the same manner as in Example 1, except that 1-hexene was used in an amount different from that in Example 1.

Example 3

An olefin polymer was prepared in the same manner as in Example 1, except that 1-hexene was used in an amount different from that in Example 1.

Example 4

The hybrid supported metallocene catalyst obtained in Preparation Example 2 was injected to an isobutane slurry loop process continuous reactor (reactor volume: 140 L, reaction flow rate: 7 m/s) to prepare an olefin polymer. As a comonomer, 1-hexene was used, and a reactor pressure was maintained at 40 bar and a polymerization temperature was maintained at 88° C.

Example 5

An olefin polymer was prepared in the same manner as in Example 1, except that 1-hexene was used in an amount different from that in Example 4.

Comparative Example 1

LUCENE™ SP310 product of LG Chemical, which is a commercial mLLDPE prepared by a slurry loop polymerization process, was prepared.

Experimental Example

Preparation of Film

The olefin polymers of Examples 1 to 5 and Comparative Example 1 were treated with an antioxidant (Irganox 1010+ Irgafos 168, CIBA), and then granulated using a twin screw extruder, followed by analysis. For film molding, inflation molding was performed using a single screw extruder (Shinhwa Industry Co., Ltd., Blown Film M/C, 50 pi, L/D=20) at an extrusion temperature of 165~200° C. to a thickness of 0.05 mm. In this regard, a die gap was 2.0 mm and a blown-up ratio was 2.3.

Evaluation of Physical Properties of Polymers and Films

Physical properties of the olefin polymers of Examples 1 to 5 and Comparative Example 1, and films prepared by using the same were evaluated by the following method, and the results are given in the following Table 1.

Further, a graph showing a relationship of frequency-complex viscosity of the olefin-based polymers according to Examples 1 and 2 and Comparative Example 1 of the present invention is shown in FIG. 1.

1) Density: ASTM 1505

2) Melt index (MI, 2.16 kg/10 kg): measurement temperature of 190° C., ASTM 1238

3) MFRR(MFR$_{10}$/MFR$_2$): a ratio obtained by dividing MFR$_{10}$ melt index (MI, load of 10 kg) by MFR$_2$(MI, load of 2.16 kg).

4) Molecular weight, Molecular weight distribution: at a measurement temperature of 160° C., a number average molecular weight, a weight average molecular weight, and a Z average molecular weight were measured by gel permeation chromatography-FTIR (GPC-FTIR). A molecular weight distribution was expressed as a ratio of the weight average molecular weight and the number average molecular weight.

5) Haze: a film was molded in a thickness of 0.05 mm, and its haze was measured in accordance with ASTM D 1003. In this regard, the measurement was repeated 10 times for each sample, and a mean value was taken.

6) Slope of complex viscosity ($\eta^*$[Pa·s]) versus frequency ($\omega$[rad/s]) curve: complex viscosity was measured using an Advanced Rheometric Expansion System (ARES) at 190° C. within a linear viscoelastic range.

Referring to Table 1 and the curve of FIG. 1, the olefin-based polymers of the present invention exhibit a broad molecular weight distribution, compared to the previous olefin-based polymer having a similar density and weight average molecular weight, and therefore, the polymers may have a superior shear thinning effect despite their high melt index, thereby showing excellent flowability and processability.

What is claimed is:

1. An olefin-based polymer having a molecular weight distribution (Mw/Mn) of 3 to 20;

a melt flow rate ratio (MFR$_{10}$/MFR$_2$) of 9 to 15, which is measured at 190° C. in accordance with ASTM1238; and a slope of −0.55 to −0.35 in a curve of complex viscosity ($\eta^*$[Pa·s]) versus frequency ($\omega$[rad/s]), wherein the olefin-based polymer has the highest short chain branching (SCB) content within a molecular weight distribution range of 0.2 to 0.8, when a weight average molecular weight (M) measured by GPC-FTIR is taken as 0.5.

2. The olefin-based polymer of claim 1, wherein the olefin-based polymer has a density of 0.910 to 0.940 g/cm$^3$.

3. The olefin-based polymer of claim 1, wherein the olefin-based polymer has a weight average molecular weight of 50,000 to 200,000 g/mol.

4. The olefin-based polymer of claim 1, wherein the olefin-based polymer is a copolymer of ethylene and alpha olefin-based comonomer.

5. The olefin-based polymer of claim 1, wherein the olefin-based polymer is prepared by polymerizing olefin-based monomers in the presence of a hybrid metallocene catalyst comprising a first metallocene compound represented by the following Chemical Formula 1; a second metallocene compound comprising one or more selected from compounds represented by the following Chemical Formula 2 and Chemical Formula 3; a cocatalyst compound; and a support:

TABLE 1

|  | Example 1 | Example 2 | Example 3 | Example 4 | Example 5 | Comparative Example 1 |
| --- | --- | --- | --- | --- | --- | --- |
| Density (g/cm$^3$) | 0.918 | 0.919 | 0.927 | 0.919 | 0.926 | 0.918 |
| MFR$_2$ | 0.92 | 0.73 | 0.54 | 0.96 | 0.51 | 0.98 |
| MFR$_{10}$ | 10.0 | 8.61 | 5.8 | 9.5 | 5.7 |  |
| MFRR | 10.9 | 12.2 | 10.7 | 9.9 | 11.2 | 7.0 |
| Weight average molecular weight (*10$^4$ g/mol) | 15.0 | 11.4 | 12.2 | 14.8 | 12.8 | 11.2 |
| Molecular weight distribution | 5.5 | 12.2 | 5.3 | 4.8 | 5.9 | 2.8 |
| Haze | 38 | 44 | 46 | 17 | 20 | 15 |
| Slope of complex viscosity versus frequency curve | −0.36 | −0.39 | −0.36 | −0.35 | −0.37 | −0.24 |

[Chemical Formula 1]

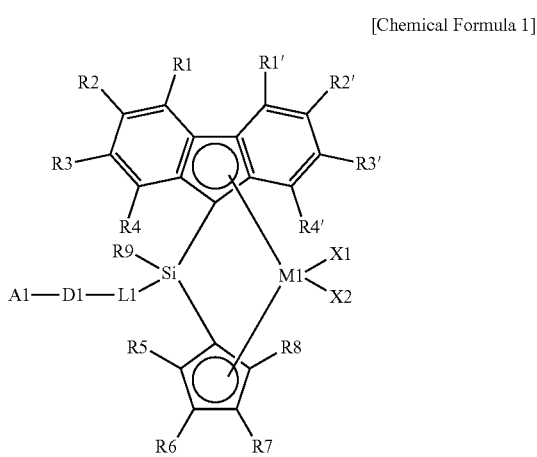

wherein R1 to R4, R9 and R1' to R4' are the same as or different from each other, and each independently hydrogen, halogen, a C1 to C20 alkyl group, a C2 to C20 alkenyl group, a C6 to C20 aryl group, a C7 to C20 alkylaryl group, or a C7 to C20 arylalkyl group;

R5 to R8 are the same as or different from each other, and each independently hydrogen, a C1 to C20 alkyl group, a C2 to C20 alkenyl group, a C6 to C20 aryl group, a C7 to C20 alkylaryl group, or a C7 to C20 arylalkyl group, and two adjacent groups of R5 to R8 are connected to each other to form one or more aliphatic rings, aromatic rings, or hetero rings;

L1 is a linear or branched C1 to C10 alkylene group;

D1 is —O—, —S—, —N(R)— or —Si(R)(R')—, in which R and R' are the same as or different from each other, and each independently hydrogen, halogen, a C1 to C20 alkyl group, a C2 to C20 alkenyl group, or a C6 to C20 aryl group;

A1 is hydrogen, halogen, a C1 to C20 alkyl group, a C2 to C20 alkenyl group, a C6 to C20 aryl group, a C7 to C20 alkylaryl group, a C7 to C20 arylalkyl group, a C1 to C20 alkoxy group, a C2 to C20 alkoxyalkyl group, a C2 to C20 heterocycloalkyl group, or a C5 to C20 heteroaryl group;

M1 is a Group 4 transition metal;

X1 and X2 are the same as or different from each other, and each independently halogen, a C1 to C20 alkyl group, a C2 to C20 alkenyl group, a C6 to C20 aryl group, a nitro group, an amido group, a C1 to C20 alkylsilyl group, a C1 to C20 alkoxy group, or a C1 to C20 sulfonate group;

[Chemical Formula 2]

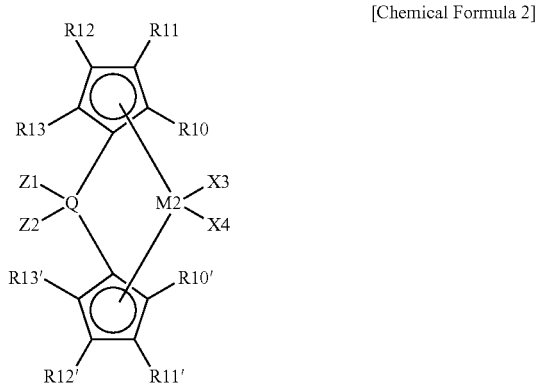

wherein R10 to R13 and R10' to R13' are the same as or different from each other, and each independently hydrogen, a C1 to C20 alkyl group, a C2 to C20 alkenyl group, a C6 to C20 aryl group, a C7 to C20 alkylaryl group, a C7 to C20 arylalkyl group, or a C1 to C20 amine group, and two adjacent groups of R10 to R13 and R10' to R13' are connected to each other to form one or more aliphatic rings, aromatic rings, or hetero rings;

Z1 and Z2 are the same as or different from each other, and each independently hydrogen, a C1 to C20 alkyl group, a C3 to C20 cycloalkyl group, a C1 to C20 alkoxy group, a C6 to C20 aryl group, a C6 to C10 aryloxy group, a C2 to C20 alkenyl group, a C7 to C40 alkylaryl group, or a C7 to C40 arylalkyl group;

Q is a C1 to C20 alkylene group, a C3 to C20 cycloalkylene group, a C6 to C20 arylene group, a C7 to C40 alkylarylene group, or a C7 to C40 arylalkylene group;

M2 is a Group 4 transition metal;

X3 and X4 are the same as or different from each other, and each independently halogen, a C1 to C20 alkyl group, a C2 to C20 alkenyl group, a C6 to C20 aryl group, a nitro group, an amido group, a C1 to C20 alkylsilyl group, a C1 to C20 alkoxy group, or a C1 to C20 sulfonate group;

[Chemical Formula 3]

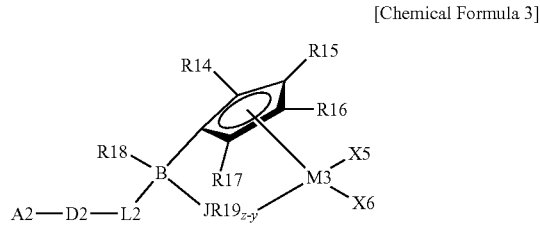

wherein M3 is a Group 4 transition metal;

X5 and X6 are the same as or different from each other, and each independently halogen, a C1 to C20 alkyl group, a C2 to C20 alkenyl group, a C6 to C20 aryl group, a nitro group, an amido group, a C1 to C20 alkylsilyl group, a C1 to C20 alkoxy group, or a C1 to C20 sulfonate group;

R14 to R19 are the same as or different from each other, and each independently hydrogen, a C1 to C20 alkyl group, a C2 to C20 alkenyl group, a C1 to C20 alkoxy group, a C6 to C20 aryl group, a C7 to C20 alkylaryl group, a C7 to C20 arylalkyl group, a C1 to C20 alkylsilyl, a C6 to C20 arylsilyl group, or a C1 to C20 amine group, and two or more adjacent groups of R14 to R17 are connected to each other to form one or more aliphatic rings, aromatic rings, or hetero rings;

L2 is a linear or branched C1 to C10 alkylene group;

D2 is —O—, —S—, —N(R)— or —Si(R)(R')—, in which R and R' are the same as or different from each other, and each independently hydrogen, halogen, a C1 to C20 alkyl group, a C2 to C20 alkenyl group, or a C6 to C20 aryl group;

A2 is hydrogen, halogen, a C1 to C20 alkyl group, a C2 to C20 alkenyl group, a C6 to C20 aryl group, a C7 to C20 alkylaryl group, a C7 to C20 arylalkyl group, a C1 to C20 alkoxy group, a C2 to C20 alkoxyalkyl group, a C2 to C20 heterocycloalkyl group, or a C5 to C20 heteroaryl group;

B is carbon, silicon, or germanium, and is a bridge connecting a cyclopentadienyl ligand and $JR19_{z-y}$ via a covalent bond;

J is an element in Group 15 or 16 of the periodic table;

z is the number of oxidation of J element; and y is the bonding number of J element.

6. The olefin-based polymer of claim 5, wherein in Chemical Formula 1, L1 is a linear or branched C4 to C8 alkylene group, and A1 is hydrogen, a methyl group, an ethyl group, a propyl group, an isopropyl group, an n-butyl group, a tert-butyl group, a methoxymethyl group, a tert-butoxymethyl group, a 1-ethoxyethyl group, a 1-methyl-1-methoxyethyl group, a tetrahydropyranyl group, or a tetrahydrofuranyl group.

7. The olefin-based polymer of claim 5, wherein in Chemical Formula 2, Q is a C1 to C20 alkylene group, Z1 and Z2 are each independently hydrogen, a C1 to C20 alkyl group, or a C1 to C20 alkoxy group, and X3 and X4 are halogen.

8. The olefin-based polymer of claim 5, wherein in Chemical Formula 3, B is silicon, J is nitrogen, and R14 to R19 are each independently hydrogen, a C1 to C20 alkyl group, a C2 to C20 alkenyl group, or a C1 to C20 alkoxy group.

9. The olefin-based polymer of claim 5, wherein the cocatalyst compound comprises one or more of compounds represented by the following Chemical Formula 4, Chemical Formula 5, and Chemical Formula 6:

—[Al(R20)-O]$n$-　　　　　　　　　[Chemical Formula 4]

wherein R20 is the same as or different from each other, and each independently halogen; C1 to C20 hydrocarbon; or C1 to C20 hydrocarbon substituted with halogen;

n is an integer of 2 or more;

$D(R20)_3$　　　　　　　　　[Chemical Formula 5]

wherein R20 is the same as defined in Chemical Formula 4;

D is aluminum or boron;

[L-H]+[ZA$_4$] or [L]+[ZA$_4$]-　　　　　　　　　[Chemical Formula 6]

wherein L is a neutral or cationic Lewis acid; H is a hydrogen atom; Z is a Group 13 element; A is the same as or different from each other, and each independently a C6 to C20 aryl group or a C1 to C20 alkyl group in which one or more hydrogen atoms are unsubstituted or substituted with halogen, C1 to C20 hydrocarbon, alkoxy, or phenoxy.

10. A film comprising the olefin-based polymer of claim 1.

* * * * *